United States Patent [19]
Kimura

[11] Patent Number: 5,372,436
[45] Date of Patent: Dec. 13, 1994

[54] TYPEWRITER HAVING A CHECK PRINTING FUNCTION

[75] Inventor: Setsuko Kimura, Nagoya, Japan

[73] Assignee: Brother Kogyo Kabushiki Kaisha, Nagoya, Japan

[21] Appl. No.: 308

[22] Filed: Jan. 4, 1993

[30] Foreign Application Priority Data

Jan. 7, 1992 [JP] Japan ..................... 4-18510

[51] Int. Cl.⁵ .............................. B41J 3/44
[52] U.S. Cl. ........................ 400/78; 364/406
[58] Field of Search ............ 400/68, 70, 78, 83; 235/3, 17; 364/406, 408

[56] References Cited

U.S. PATENT DOCUMENTS

| | | | |
|---|---|---|---|
| 3,920,979 | 11/1975 | Kilby | 400/78 |
| 4,276,598 | 6/1981 | Inoue | 235/3 |
| 4,527,917 | 7/1985 | Ueno | 400/78 |
| 4,553,219 | 11/1985 | Ueno | 400/78 |
| 4,569,029 | 2/1986 | Hatta | 364/406 |
| 4,604,696 | 8/1986 | Suganuma | 364/406 |
| 4,623,965 | 11/1986 | Wing | 364/406 |
| 5,021,952 | 6/1991 | Nishimura | 364/406 |

FOREIGN PATENT DOCUMENTS 2081185 2/1982 United Kingdom ............ 400/124

OTHER PUBLICATIONS

Quicken Software Users Manual 1989 pp. 5-1, 5-2, 22-1, and 22-3.

*Primary Examiner*—David A. Wiecking
*Assistant Examiner*—Steven S. Kelley
*Attorney, Agent, or Firm*—Oliff & Berridge

[57] ABSTRACT

A typewriter having a check printing function includes a keyboard for inputting various character data and commands, a display for displaying the character data input from the keyboard, a printing mechanism for printing the character data input from the keyboard, a check data memory for temporarily storing the character data input from the keyboard and to be printed on a check, and a control device for controlling the printing mechanism to print the data stored in the check data memory on the check in a preset format in response to a predetermined output command input from the keyboard. Accordingly, it is possible to simplify the check printing operation for printing the necessary information at desired positions on the check.

24 Claims, 27 Drawing Sheets

Fig.4

| RECORD NUMBER | DATE | DESCRIPTION | WITH-DRAWAL | DEPOSIT | BALANCE |
|---|---|---|---|---|---|
| 1 | 8/ 1/ 91 | | | $7,000.00 | $7,000.00 |
| 2 | 8/ 5/ 91 | Central Electric····· | $39.00 | | $6,961.00 |
| 3 | 8/ 6/ 91 | The Waterworks····· | $23.00 | | $6,938.00 |
| 4 | | | | | |
| 5 | ···· | ···· | ···· | ···· | ···· |
| 29 | | | | | |
| 30 | | | | | |

《MAIN MENU》

1. WITHDRAWAL
2. DEPOSIT
3. CLEAR
4. PRINT

Fig.26

《WITHDRAWAL》

DATE:
WITHDRAWAL:
DESCRIPTION:

Fig.27

《POSITION SET》

DATE:      5L,   34C
WITHDRAWAL:     9L,   12C
DESCRIPTION:    7L,   12C

Fig.28

《WITHDRAWAL》

DATE: 8/5/'91
WITHDRAWAL: $39
DESCRIPTION: Central Electric
             Power Co.

Fig.30

The BROTHER Bank

123456

Place: _____  Date: 8/5 1991

Pay to the Order of: Central Electric Power Co.

$ 39.00

Citibank, L.A.

AUTHORIZED SIGNATURE

| DATE | DESCRIPTION | WITHDRAWAL | DEPOSIT | BALANCE |
|---|---|---|---|---|
| 8/1/'91 | THE START | | $7,000.00 | $7,000.00 |
| 8/5/'91 | Central Electric Power Co. | $39.00 | | $6,961.00 |
| 8/6/'91 | The Waterworks Bureau. | $23.00 | | $6,938.00 |
| 8/7/'91 | Toho Gas Co. | $25.00 | | $6,913.00 |
| 8/25/'91 | SALARY | | $1,540.00 | $8,453.00 |
| 8/26/'91 | FOOD COST | $307.00 | | $8,146.00 |

《DEPOSIT》
DATE: ▨
DEPOSIT:
DESCRIPTION:

Fig.35

《DEPOSIT》
DATE: 8/25/'91
DEPOSIT: $1,540
DESCRIPTION: Salary▨

TYPEWRITER HAVING A CHECK PRINTING FUNCTION

BACKGROUND OF THE INVENTION

1. Field of the Invention

The present invention relates to a typewriter having a check printing function and, more particularly, to a typewriter having a check printing function which can print necessary information at desired positions on a check and perform balance management in an account in relation to check writing and deposits and withdrawals.

2. Description of Related Art

In some cases, a check for an amount corresponding to that brought to a bank is written by the bank, but in most cases, a check is written by an individual after opening a current account with a particular bank and using a checkbook issued by the bank.

When writing a check, such necessary information as a date, name of payee, amount, signature of drawer, place of drawing, and account number must be written on the check at given entry positions by the individual.

In writing such necessary information on the check, the individual sometimes enters the necessary information on the check in his/her own writing, while at other times, the individual uses a typewriter to print the necessary information at the given entry positions on the check in order to ensure clearness in the characters to be entered.

In the latter case, the check is first set on the typewriter, and a platen and a carriage of the typewriter are manually driven to make the print positions respectively coincide with the given entry positions. Thereafter, desired characters including letters, numerals and symbols are input from a keyboard of the typewriter, and they are printed at the given entry positions.

As mentioned above, when using a typewriter to print the characters at the given entry positions on the check, the individual must manually move the platen and the carriage to the given entry positions. Accordingly, printing the necessary information on the check is troublesome, and the efficiency is reduced.

Furthermore, the prior art typewriter used for check printing does not include a calculating function. Accordingly, there is a possibility that the check is inadvertently written regardless of a negative balance in the current account.

SUMMARY OF THE PRESENT INVENTION

It is accordingly an object of the present invention to provide a typewriter having a check printing function which can simplify the check printing operation by printing necessary information at desired positions on a check.

It is another object of the present invention to provide a typewriter having a check printing function which can realize personal management of a balance in an account.

According to a first preferred embodiment of the present invention, as shown in FIG. 1, a typewriter of the present invention has a check printing function. The typewriter comprises input means for inputting various characters and commands, display means for displaying the characters input from the input means, print means for printing the characters input from the input means, a check data memory for temporarily storing character data input from the input means and to be printed on a check, and output control means for controlling the print means to print the data stored in the check data memory on the check in a preset format in response to a predetermined output command input from the input means.

In the typewriter according to the first preferred embodiment of the present invention, the character data input from the input means and to be printed on the check are temporarily stored into the check data memory. The print means is controlled by the output control means to print the data stored in the check data memory on the check in a preset format in response to a predetermined output command input from the input means.

Thus, the character data comprising the necessary information to be printed on the check are stored, and the stored data are printed on the check set on the typewriter in a preset format. Accordingly, the check printing operation, which prints the necessary information at desired positions on the check, can be simplified, and the efficiency can be improved.

According to a second preferred embodiment of the present invention, as shown in FIG. 1, a typewriter is provided, having a check printing function according to the first preferred embodiment mentioned above. The typewriter further comprises a deposit-withdrawal memory capable of storing plural sets of data input from the input means in a time-series manner and balance calculating means. Each of the sets has data including a date, description, deposit or withdrawal amount and balance. The balance calculating means calculates an updated balance according to deposit or withdrawal data input from the input means and current balance data stored in the deposit-withdrawal memory and stores the updated balance data into the deposit-withdrawal memory.

In the typewriter according to the second preferred embodiment of the present invention, in addition to the operation of the typewriter according to the first preferred embodiment, data including a date, description, deposit, withdrawal and balance are stored as one set into the deposit-withdrawal memory, and a plurality of sets of the data is stored into this memory in a time-series manner. When deposit or withdrawal data is input from the input means, an updated balance is calculated by the balance calculating means according to the deposit or withdrawal data input above and the current balance data stored in the deposit-withdrawal memory, and the updated balance data thus calculated is stored into the deposit-withdrawal memory. Accordingly, management of a balance in an account can be personally performed.

According to a third preferred embodiment of the present invention as shown in FIG. 1, a typewriter is provided, having a check printing function according to the second preferred embodiment mentioned above. The typewriter further comprises warning means for giving a warning of a condition that the updated balance obtained by the balance calculating means is negative (i.e., overdrawn).

In the typewriter according to the third preferred embodiment of the present invention, in addition to the operation of the typewriter according to the second preferred embodiment, when the updated balance obtained by the balance calculating means is negative, an overdrawn or negative condition of the updated balance is indicated by the warning means. Accordingly, the operator can positively confirm whether or not the updated balance becomes negative upon drawing a check.

Other objects and features of the invention will be more fully understood from the following detailed description and appended claims when taken with the accompanying drawings.

BRIEF DESCRIPTION OF THE DRAWINGS

FIG. 4 shows a data structure in a deposit-withdrawal memory;

FIG. 25 shows a display of a main menu relating to balance management;

FIG. 26 shows a display of a prompt for setting withdrawal contents;

FIG. 27 shows a display of a prompt for setting print positions for check print;

FIG. 28 corresponds to FIG. 26, and shows a display of input data;

FIG. 30 shows a check corresponding to FIG. 29, printed with the input data;

FIG. 33 shows a paper, printed with the recorded contents in a preset format;

FIG. 34 shows a display of a prompt for setting deposit contents;

FIG. 35 corresponds to FIG. 34, and shows a display of input data; and

DETAILED DESCRIPTION OF THE PREFERRED EMBODIMENTS

The present invention will be described in detail with reference to the accompanying drawings which illustrate preferred embodiments of the present invention applied to an English language electronic typewriter having a check printing capability.

Figure 1:
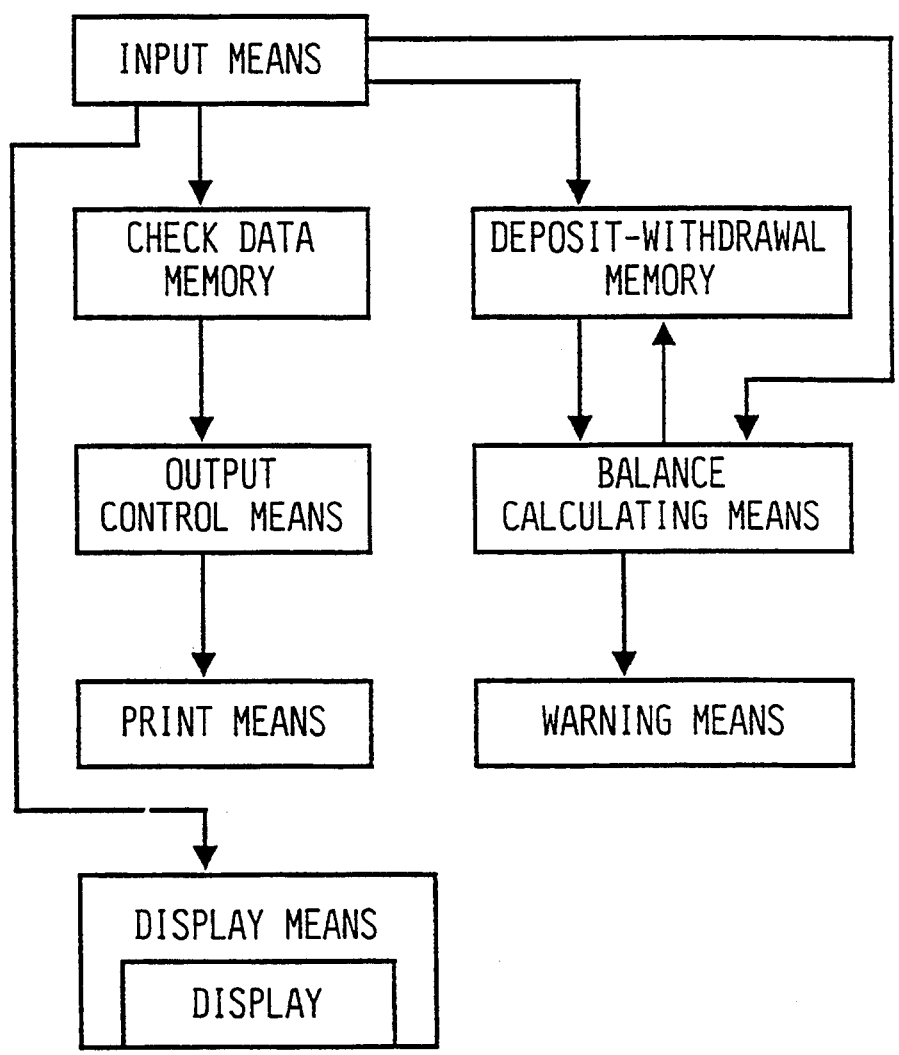
FIG. 1 shows a functional block diagram illustrating the present invention.
Figure 2:
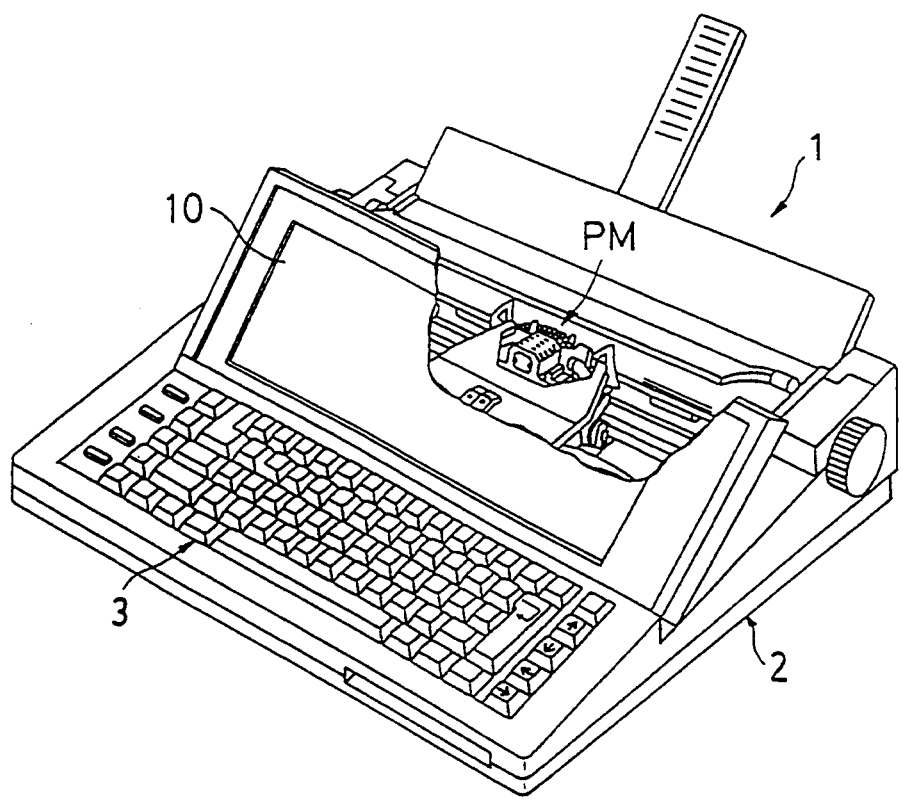
FIG. 2 shows a perspective view of an electronic typewriter according to a preferred embodiment of the present invention.

FIG. 2 shows an electronic typewriter 1 having a body frame 2, a keyboard 3 provided at a front portion of the body frame 2, a type-wheel type printing mechanism PM provided in the body frame 2 behind the keyboard 3, and a liquid crystal display 10 provided at a rear portion of the keyboard 3. The liquid crystal display 10 displays a plurality of lines of characters including alphabetic letters, numerals and symbols.

As is conventional, the keyboard 3 is provided with a plurality of character keys including alphabet keys, numeral keys and symbol keys, a space key, a return key, a plurality of cursor movement keys for moving a cursor on the display 10 in upper, lower, right and left directions, and an edit key for performing various editing functions. According to the preferred embodiments, the keyboard 3 is further provided with a balance management key for performing a balance managing function for a current account, a document input key for inputting various document data, a record key for storing the input document data into a memory, a position key for setting a print start position of the input document data, a store key for storing the print start position into another memory, a cancel key for quitting various functions, and a print key for printing the document data.

The printing mechanism PM is of a conventional type wheel type including a platen, a carriage, a type wheel, etc., and so the detailed explanation thereof will be omitted.

Figure 3:
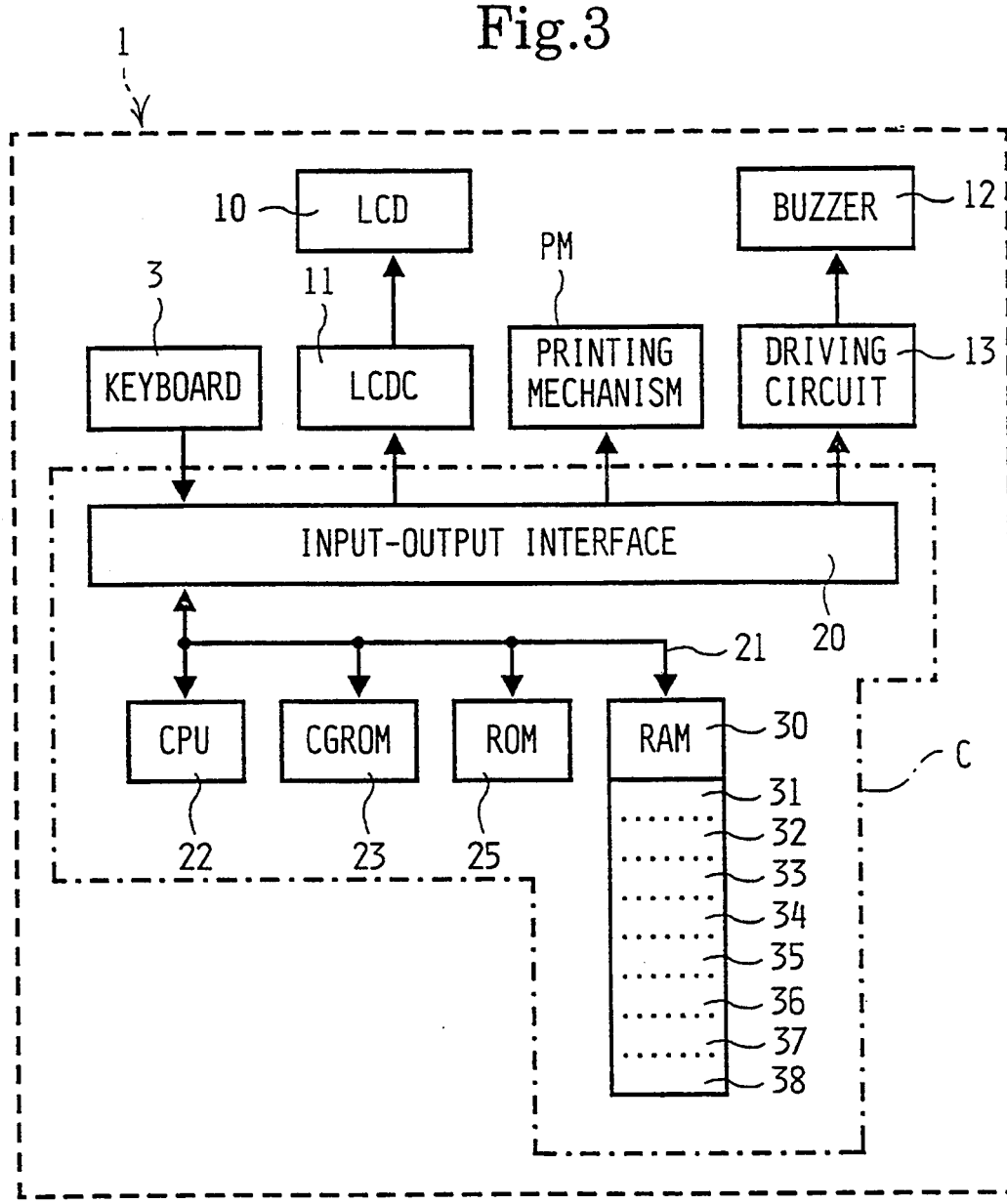
FIG. 3 shows a block diagram of a control system in the electronic typewriter.

A control system of the typewriter 1 is constructed as shown by the block diagram shown in FIG. 3. Referring to FIG. 3, the keyboard 3, a display controller (LCDC) 11, the printing mechanism PM, and a driving circuit 13 for driving an alarm buzzer 12 are each connected to an input-output interface 20 of a control device C. The display controller 11 includes a display RAM (not shown) and generates and outputs display data to the liquid crystal display (LCD) 10.

The control device C comprises a CPU 22, the input-output interface 20, a CGROM (pattern data memory) 23, a ROM 25 and a RAM 30. The input-output interface 20, the CGROM 23, the ROM 25 and the RAM 30 are connected to the CPU 22 through a bus 21. The CGROM 23 preliminarily stores dot pattern data to be displayed for various characters corresponding to code data. The ROM 25 preliminarily stores a display drive control program for controlling the display controller 11 in accordance with code data corresponding to characters input from the keyboard 3, a print drive control program for driving the printing mechanism PM in accordance with the code data input or data read from the RAM 30, and a control program for controlling the check printing and balance management functions of the present invention, which will be hereinafter described in detail.

The RAM 30 includes an input buffer 31, a deposit-withdrawal memory 32, a balance memory 33, a print position memory 34, a counter 35, a current position memory 36, a save buffer 37, and a flag memory 38. The input buffer 31 temporarily stores document data as code data corresponding to characters input from the keyboard 3. The deposit-withdrawal memory 32 stores sets of data, each having a deposit, withdrawal, balance, etc., input from the keyboard 3. Preferably, the deposit-withdrawal memory has sufficient space to store 30 such sets. The balance memory 33 stores an updated balance. The print position memory 34 stores the locations, as a number of lines L and a number of columns C, defining each print start position of such items as the date and the amount to be printed on a check CH. The counter 35 counts the number of lines L and the number of columns C defining a current print position to be updated, in accordance with a line feed command and movement of the carriage, to obtain a line count value LC and a column count value CC of the current print position. When the printing mechanism PM is initialized by moving a print head (i.e., the carriage) to an absolute origin, the values LC and CC of the counter 35, to define a print position corresponding to this absolute origin, are set to "0." The current position memory 36 stores the line count value LC and the column count value CC obtained by the counter 35.

The save buffer 37 temporarily stores various data. The flag memory 38 stores flag data of a balance flag ZF. The flag ZF is set when the account balance is positive (i.e. the flag is "1"), whereas the flag ZF is reset when the balance is negative (i.e., the flag is "0"), and also stores flag data of a display flag DF to be set when the balance is displayed. The typewriter 1 is provided with a backup power source for maintaining the contents stored in at least the deposit-withdrawal memory 32, the balance memory 33, the print position memory 34 and the flag memory 38 when a power switch of the typewriter 1 is turned off or power to the typewriter is otherwise lost. The input buffer 31 and the save buffer 37 are similar in construction to the deposit-withdrawal memory 32 with the exception that a memory area for the balance data is not provided.

As shown in FIG. 4, date data, description data, withdrawal data, deposit data and balance data are recorded as one set in the deposit-withdrawal memory 32, and a maximum recordable number of sets of these data is preferably set to 30. Further, a maximum recordable number of characters constituting the description data in each set is preferably set to 30, for example.

Now, a control routine for the check printing and balance management functions performed by the control device C of the electronic typewriter 1 will be described with reference to the flowcharts shown in FIGS. 5 to 24, in which reference characters Si (i=10, 11, 12, ...) denote steps in the control routine.

Figure 5:
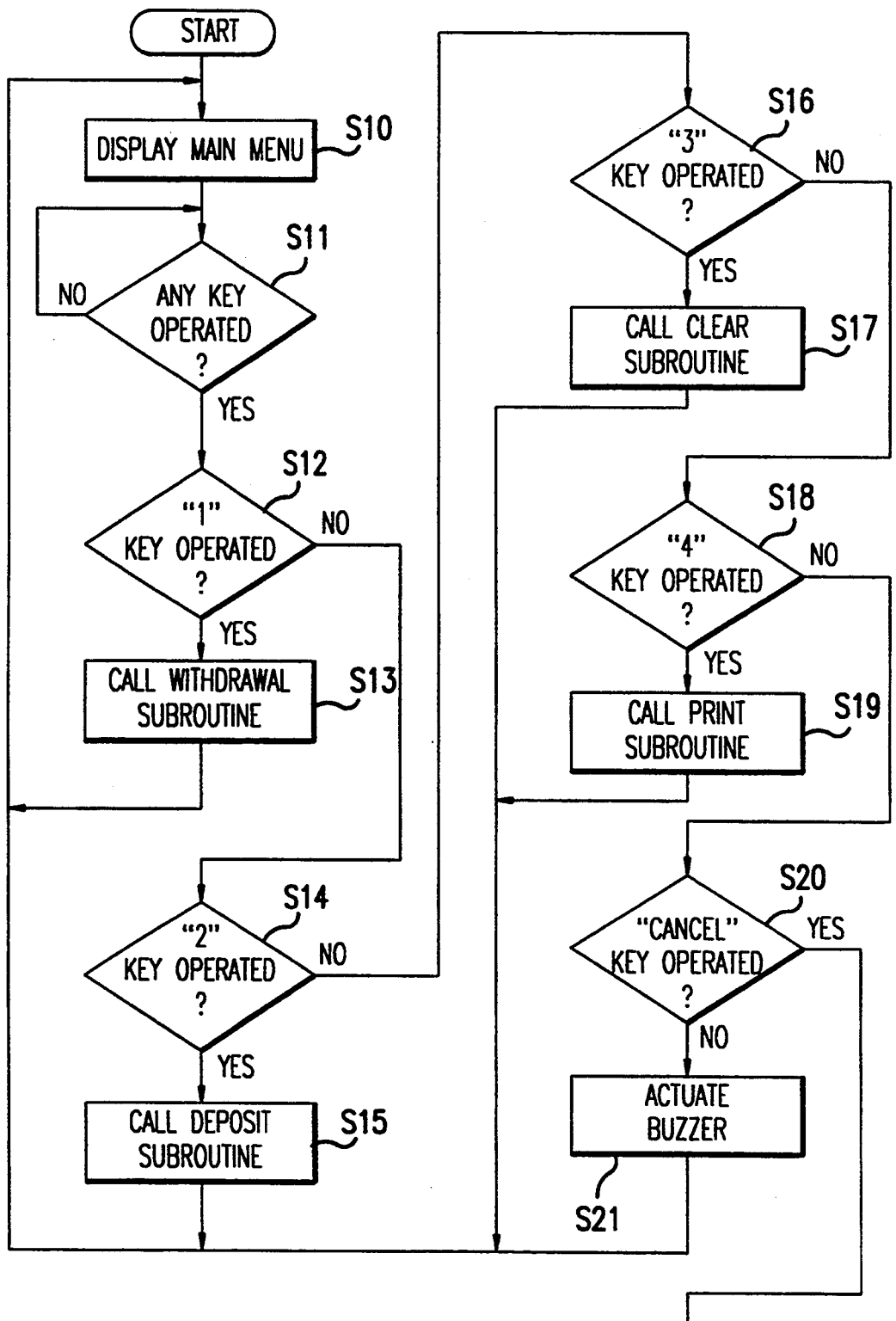
FIG. 5 is a schematic flowchart of a check print and balance management control routine.

As shown in FIG. 5, if the balance management key of the keyboard 3 is operated, control of the check printing and the balance management functions is started. A main menu relating to the balance management is first displayed on the display 10 (S10). The main menu to be displayed comprises for example, four items, as shown in FIG. 25. The four items are "withdrawal", labeled with the selection numeral "1"; "deposit", labeled with the selection numeral "2"; "clear" (which clears the contents of the records), labeled with the selection numeral "3"; and "print" (which prints the contents of the records), labeled with the selection numeral "4".

If the numeral "1" key is operated to select the first item of "WITHDRAWAL", to print a check CH, steps S11 and S12 are answered "yes" (steps S11 and S12: Yes), and the withdrawal control routine set forth in FIG. 6 is executed by calling the withdrawal process subroutine (S13).

Figure 6:
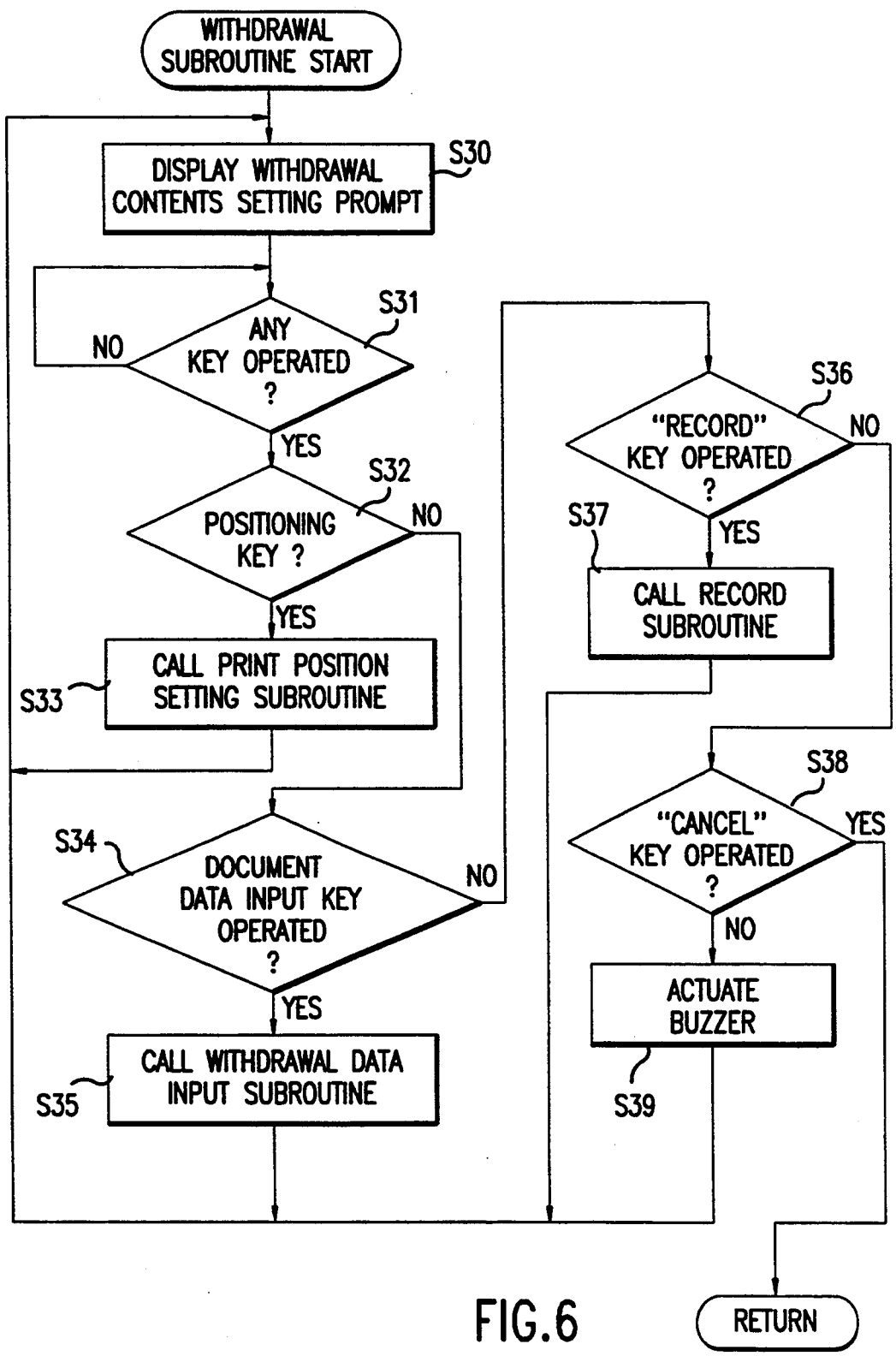
FIG. 6 is a schematic flowchart of a withdrawal control routine.

Referring to FIG. 6, if the withdrawal subroutine is called, control jumps to step S30. A withdrawal contents setting prompt is first displayed on the display 10 (S30). For example, this setting prompt is composed of three items of "DATE," "WITHDRAWAL" and "DESCRIPTION" as shown in FIG. 26. Each of these three items to be set is followed by an underlined field displayed on the right-hand side thereof, and characters are adapted to be input into each underlined field within the lengthwise range thereof.

Figure 7:
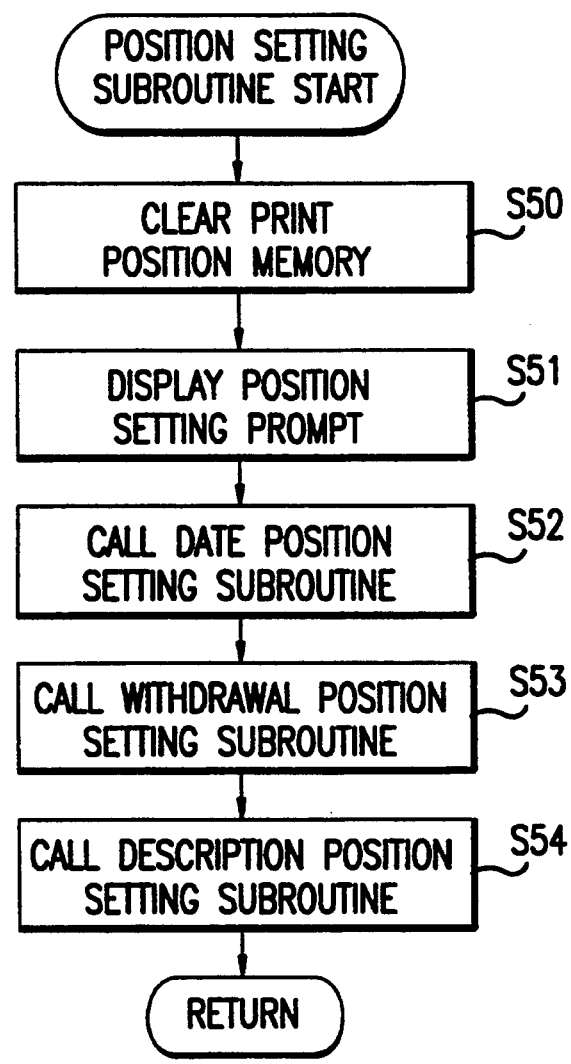
FIG. 7 is a schematic flowchart of a position setting control routine.

If the position key is operated, so as to set a leading position of each of the three items to be printed on the check CH in relation to the check CH (steps S31 and S32: Yes), the print position setting subroutine shown in FIG. 7 is executed by calling it in step S33. The position is used when setting up the control routine, or whenever the locations on the check of the data to be printed changes. This may occur if the bank changes its check style, or the type of check used by the operator changes. When operating the position key, it is assumed that the check CH has been placed onto the typewriter 1 by the operator, and the print position (print head position) of the carriage has been positioned at a left upper corner of the check CH, as shown by the position P0 in FIG. 29, for example. That is, the line count value LC and the column count value CC stored in the current position memory 36 are set to "0".

Referring to FIG. 7, if the print position setting subroutine is called, control jumps to step S50. The print position memory 34 is first cleared (S50), and a position setting prompt is displayed on the display 10 (S51). For example, the position setting prompt comprises the three items of "DATE," "WITHDRAWAL" and "DESCRIPTION" as shown in FIG. 27. In each item, the number of lines L and the number of columns C representing a print start position are displayed. These numbers are initially displayed as "0". Then, a date position setting subroutine as shown in FIG. 8 is called in step S52.

Figure 8:
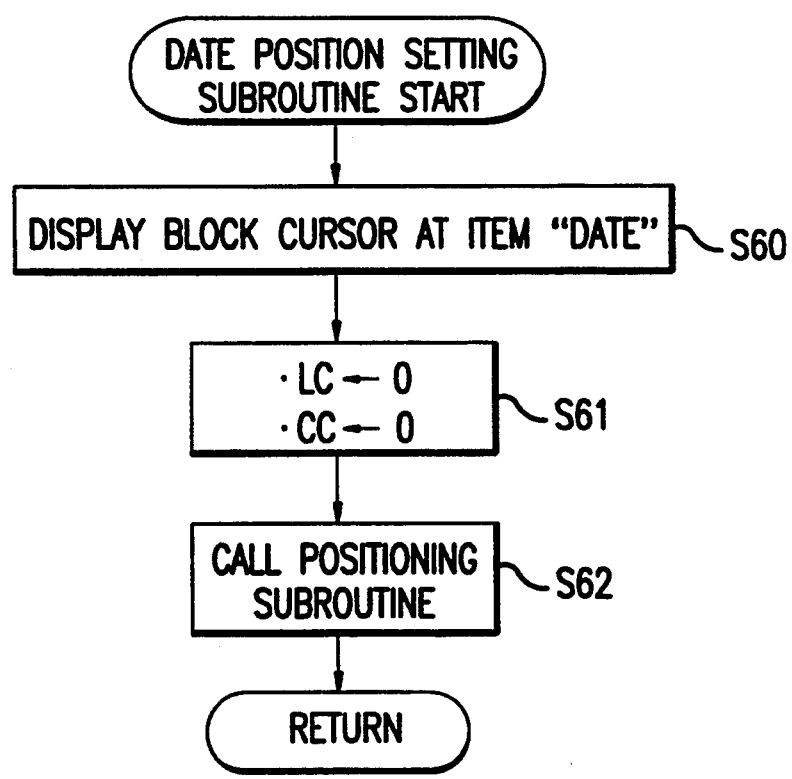
FIG. 8 is a schematic flowchart of a date position setting control routine.

Referring to FIG. 8, if the date position setting subroutine is called, control jumps to step S60. A block cursor is displayed at the item of "DATE" to wait for setting of a date position (S60), and the line count value LC and the column count value CC are reset (S61). To execute actual positioning control, the positioning subroutine shown in FIG. 11 is called in step S62.

Figure 11:
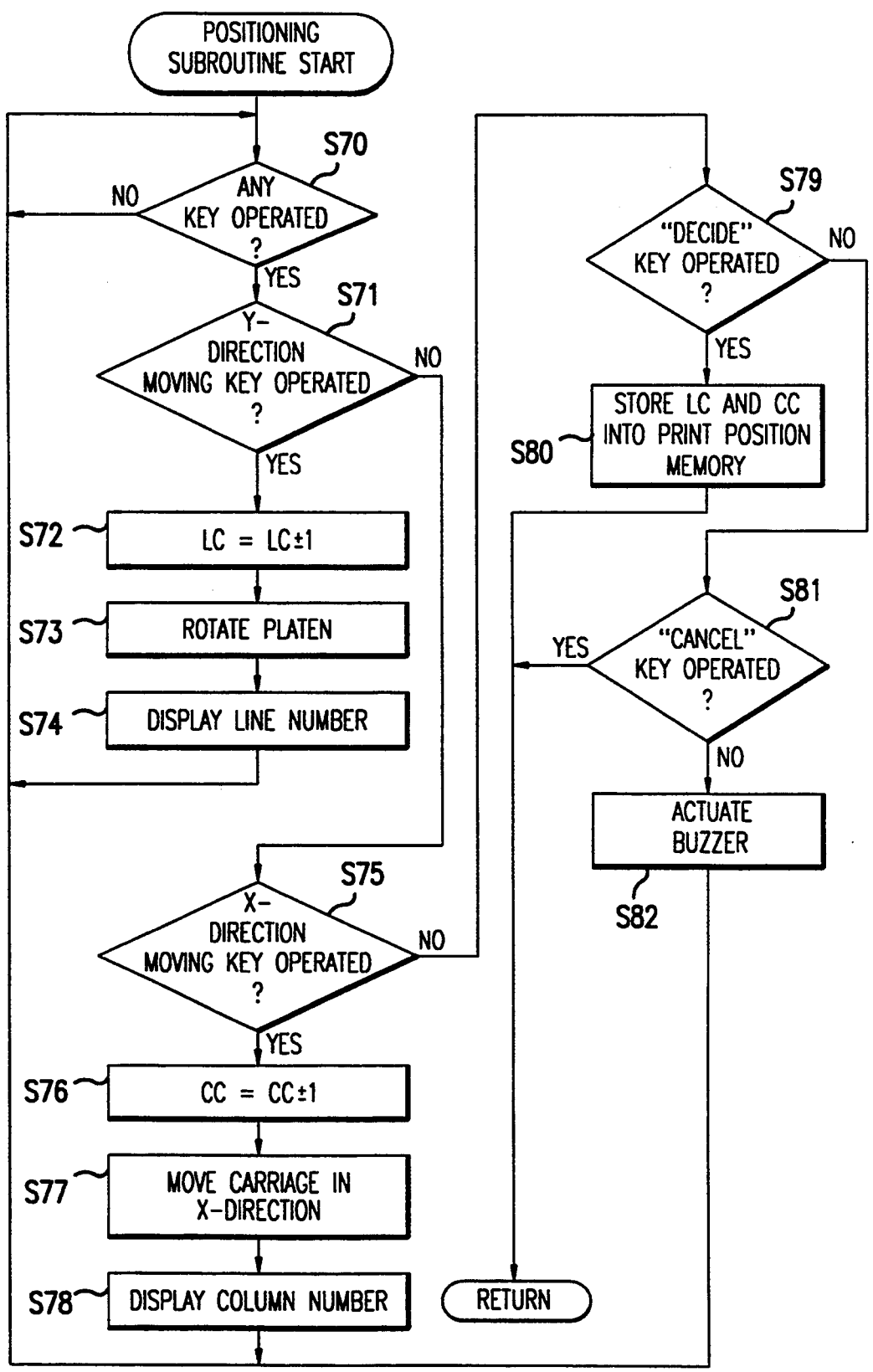
FIG. 11 is a schematic flowchart of a positioning control routine.

Referring to FIG. 11, if the positioning subroutine is called, control jumps to step 70. If a Y-direction (i.e., a direction perpendicular to a print direction) moving key such as a return key or a pre-line key is operated, steps S70 and S71 are answered "yes" (steps S70 and S71: Yes) and the line count value LC is incremented or decremented according to the which Y-direction moving key is used (S72), and the platen is rotated forwardly or reversely in accordance with the line count value LC thus obtained (S73). Furthermore, the number of the lines L corresponding to the line count value LC thus obtained is displayed (S74). Then, control is returned to step S70.

If an X-direction (i.e., the print direction moving key such as a space key or a backspace key is operated, steps S70 and S75 are answered "yes" and step S71 is answered "no" (steps S70 and S75: Yes; step S71: No), and the column count value CC is incremented or decremented according to which the X-direction moving key is used (S76). The carriage is moved forward or backward in the print direction in accordance with the column count value CC thus obtained (S77). Furthermore, the number of columns C corresponding to the column count value CC thus obtained is displayed (S78). Then, control is returned to step S70.

If the carriage has been moved to the desired print position, the decide key is then operated (steps S70 and S79: Yes; steps S71 and S75: No). The line count value LC and the column count value CC obtained above are stored into a date memory area in the print position memory 34 (S80), and the positioning subroutine is then ended and control returns through step S62 to step S52. On the other hand, if the cancel key is operated (steps S70 and S81: Yes; steps S71, S75 and S79: No), this call to the positioning subroutine is then ended and control returns to step S62, which then returns control to step S52. In either case, control then proceeds to step S53. Further, if any key other than the Y-direction moving key, the X-direction moving key, the decide key and the cancel key is operated, the alarm buzzer 12 is actuated (S82), and control is returned to S70.

Figure 9:
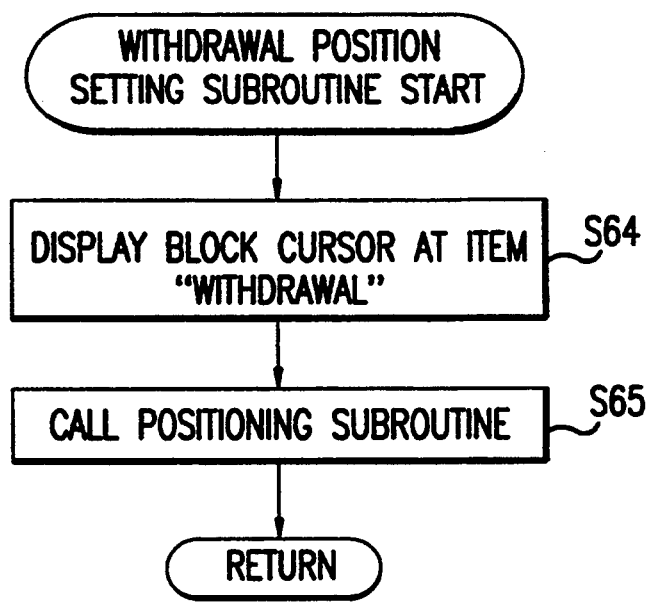
FIG. 9 is a schematic flowchart of a withdrawal position setting control routine.

Referring again to FIG. 7, the withdrawal position setting subroutine shown in FIG. 9 is then executed by calling it in step S53. Referring to FIG. 9, when the withdrawal position setting subroutine is started, the block cursor is displayed at the item of "WITHDRAWAL" to wait for setting of a withdrawal position (S64), and actual positioning subroutine discussed above and shown in FIG. 11 is then called again (S65). After positioning the withdrawal line, control now returns from the positioning subroutine through step S65 to step S53. Control then proceeds to step S54.

Figure 10:
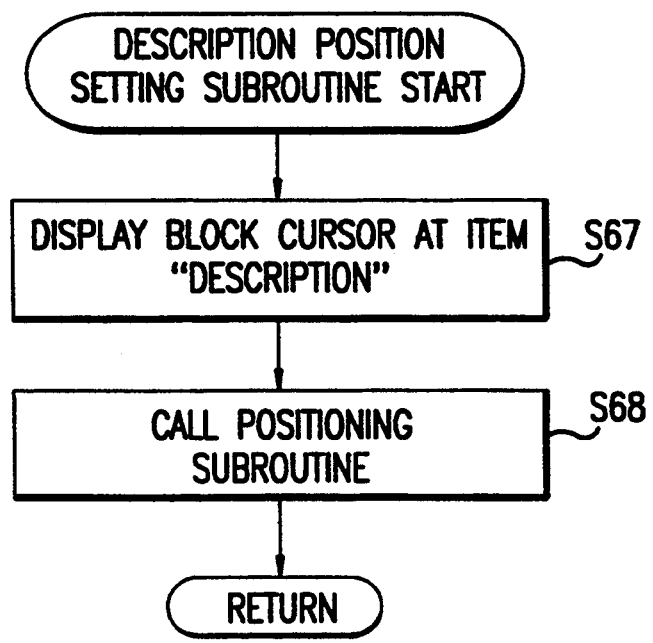
FIG. 10 is a schematic flowchart of a description position setting control routine.

Referring once again to FIG. 7, the description position setting subroutine shown in FIG. 10 is then executed by calling it in step S54. Referring to FIG. 10, when the description position setting subroutine is started, the block cursor is displayed at the item of "DESCRIPTION" to wait for the setting of a description position (S67). The positioning subroutine shown in FIG. 11 is then executed once again by calling the positioning subroutine in step S68. After positioning the description line, control returns to step S54 through step S68. Control then proceeds by returning to step S33.

Figure 29:
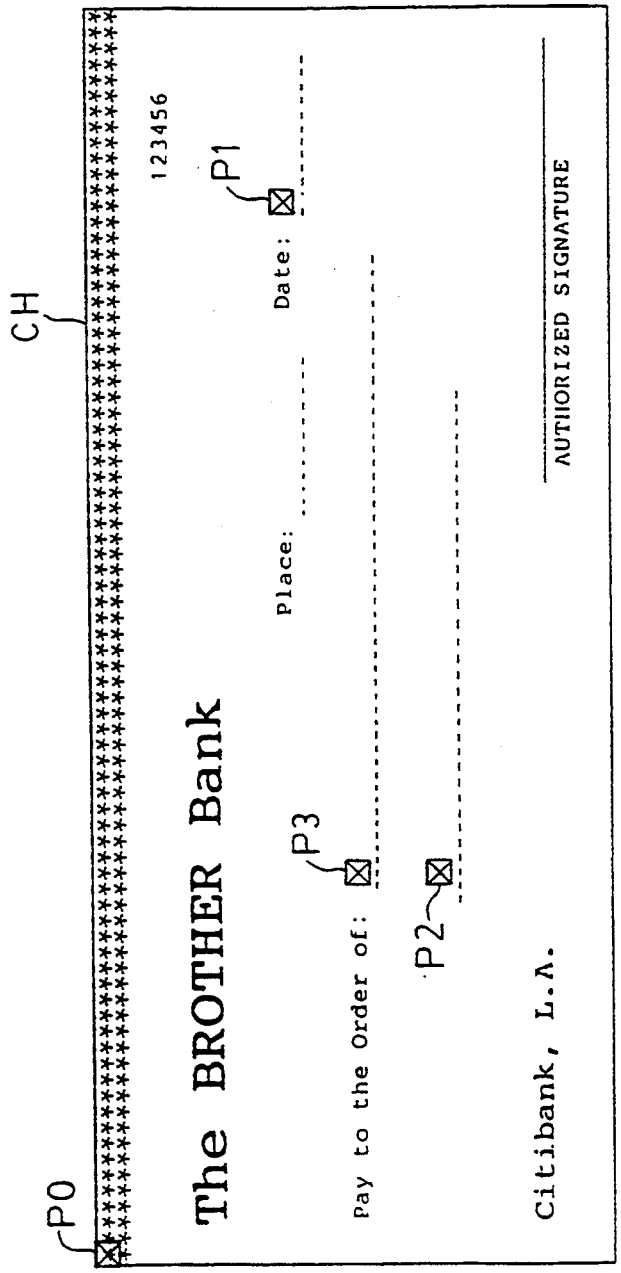
FIG. 29 shows a check, illustrating the preset print positions.

The program then returns to S30 to display the input data as shown in FIG. 27 on the display 10. For example, as shown in FIGS. 27 and 29, the number of lines L and the number of columns C corresponding to a print start position P1 of the item "DATE", the number of lines L and the number of columns C corresponding to a print start position P2 of the item "WITHDRAWAL," and the number of lines L and the number of columns C corresponding to a print start position P3 of the item "DESCRIPTION" are displayed. These print position data have also been stored in the corresponding predetermined memory areas of the print position memory 34.

Figure 12:
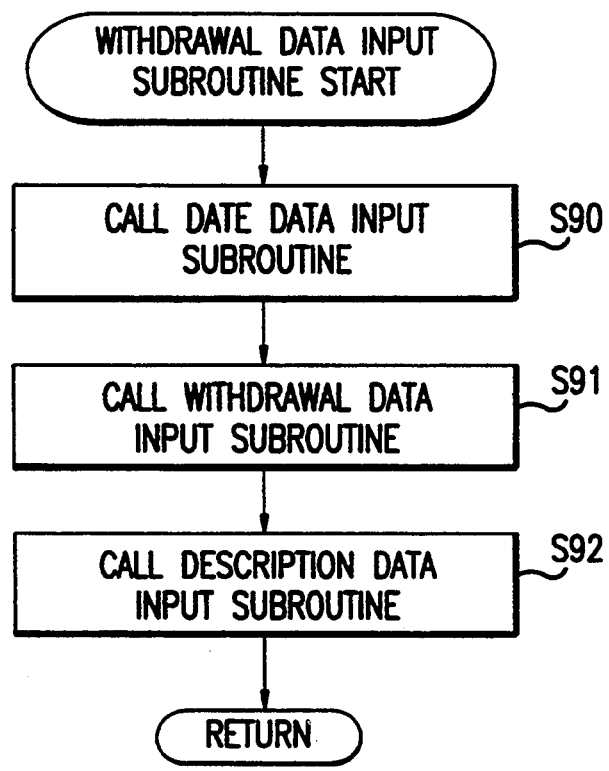
FIG. 12 is a schematic flowchart of a withdrawal data input control routine.
Figure 13:
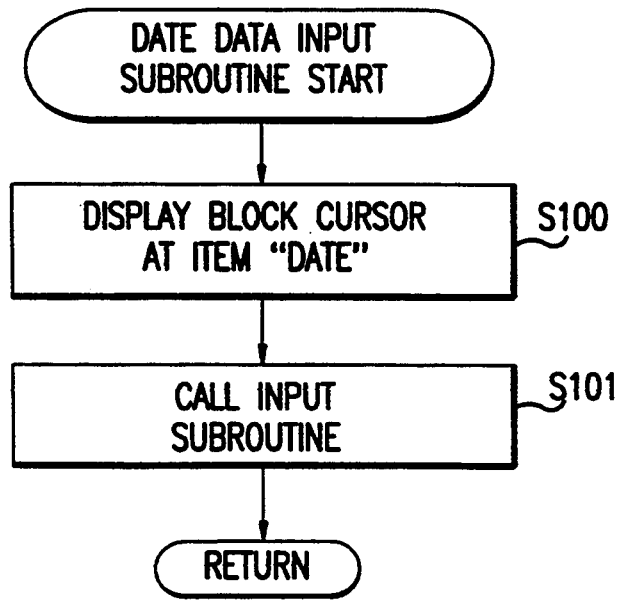
FIG. 13 is a schematic flowchart of a withdrawal date data input control routine.

Thereafter, referring to FIG. 6, if the document input key is operated (steps S31 and S34: Yes; step S32: No), the withdrawal data input subroutine shown in FIG. 12 is called in step S35. Referring to FIG. 12, when this subroutine is started, the date data input subroutine shown in FIG. 13 is called in step S90. Referring to FIG. 13, when the date data input subroutine is started, the block cursor is displayed at the item of "DATE" to wait for inputting of a date (S100). The date data input subroutine shown in FIG. 16 is then called in step S101.

Figure 16:
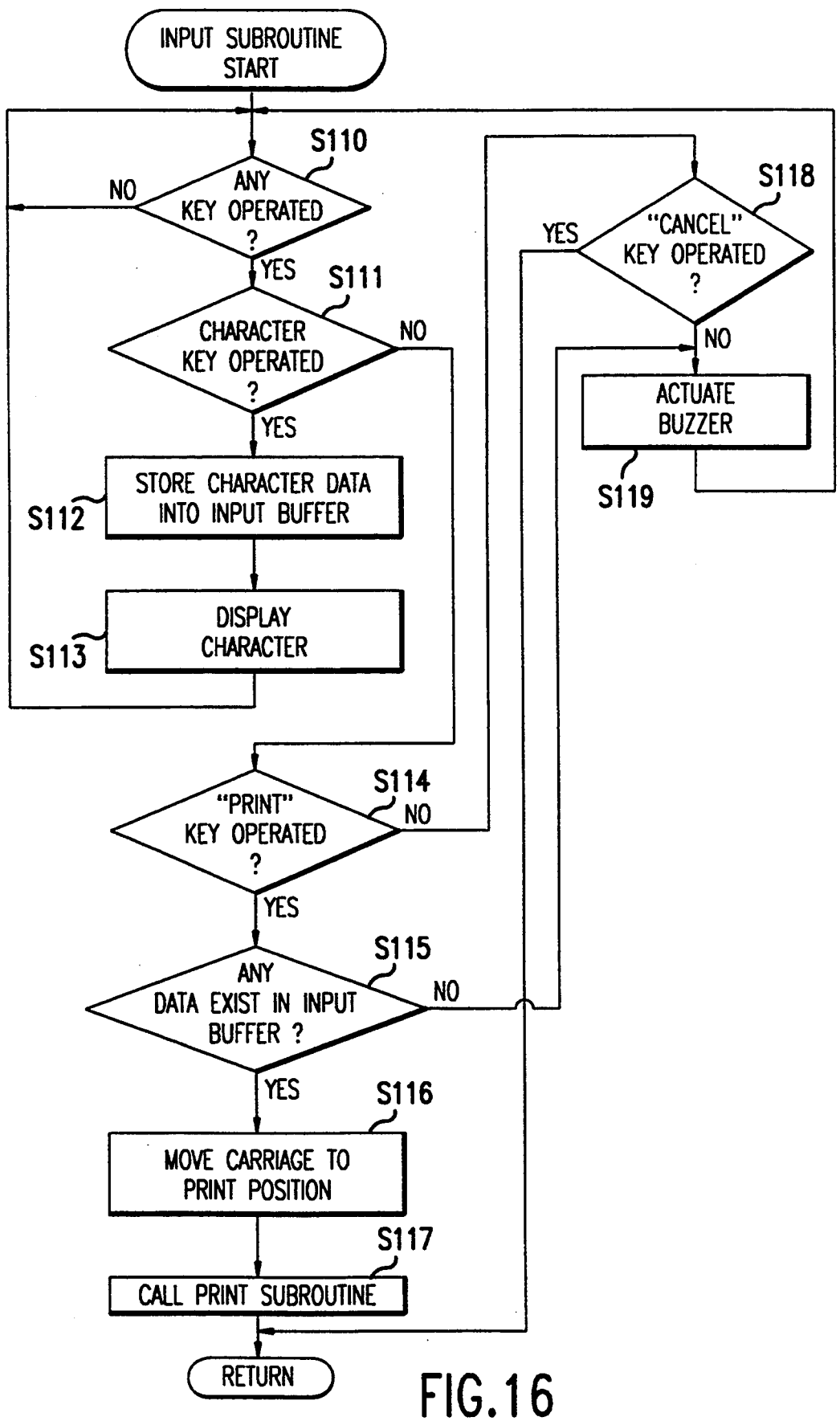
FIG. 16 is a schematic flowchart of an input control routine in the withdrawal control.

Referring to FIG. 16, when the date data input subroutine is started, the desired character keys are operated (steps S110 and S111: Yes). Then, the code data corresponding to the character keys so operated are stored into a date data memory area of the input data buffer 31 (S112), and characters corresponding to the character keys operated are displayed on the display 10 (S113). Then, the control is returned to step S110. For example, as shown in FIG. 28, the date of "Aug. 5, 1991" is displayed on the right-hand side of the item "DATE" on the display 10.

Subsequently, if the print key is operated (assuming the check CH is set and the print head is located at the initial position P0) so as to actually print the date input above on the check CH (steps S110 and S114: Yes; step S111: No), document data in the input data buffer 31 is searched. If any data exists in the input data buffer 31 (step S115: Yes), the platen and the carriage are driven according to the date position data stored in the print position memory 34 to feed the check CH and move the print head to the print start position P1 previously set (S116). Then the date data stored in the input data buffer 31 is read out to start printing from the print start position P1 (S117). After printing the input data on the check CH, the date data input subroutine returns control through step S101 to step S90. Control then proceeds to step S91.

On the other hand, if the cancel key is operated, so as not to print the input data on the check CH (steps S110 and S118: Yes; steps S111 and S114: No), the date data input subroutine again returns control to step S90. Further, if any key other than the character keys, the print key and the cancel key is operated (step S110: Yes; steps S111, S114 and S118: No), the alarm buzzer 12 is actuated (S119), and control is returned to S110. Further, if the print key is operated, and no data exists in the input data buffer 31 (step S115: No), the alarm buzzer 12 is also actuated (S119), and control is returned to S110.

Figure 14:
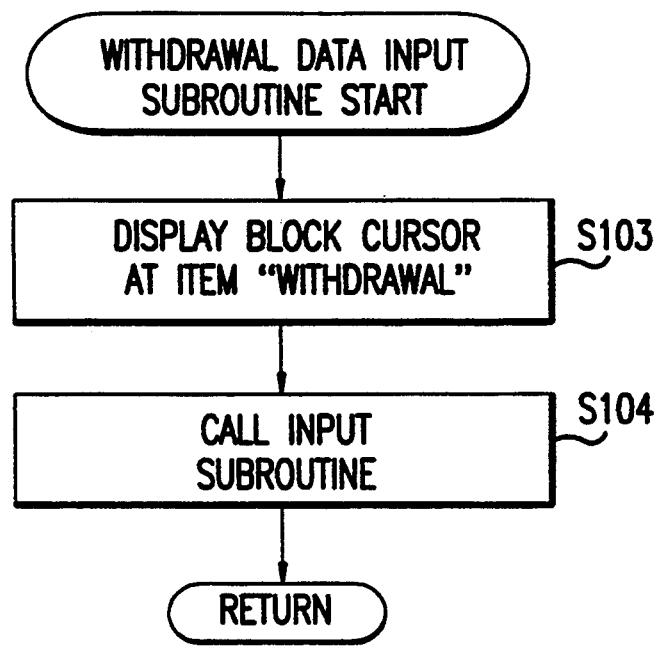
FIG. 14 is a schematic flowchart of a withdrawal amount data input control routine.

Referring again to FIG. 12, the withdrawal data input subroutine shown in FIG. 14 is then called in step S91. Referring to FIG. 14, when the withdrawal data input subroutine is started, the block cursor is displayed at the item of "WITHDRAWAL" to wait for inputting of a withdrawal (S103). Then, the actual input subroutine shown in FIG. 16 is then called in step S104. After printing the "withdrawal" item, control returns to step S90 through step S104. Control then proceeds to step S92.

Figure 15:
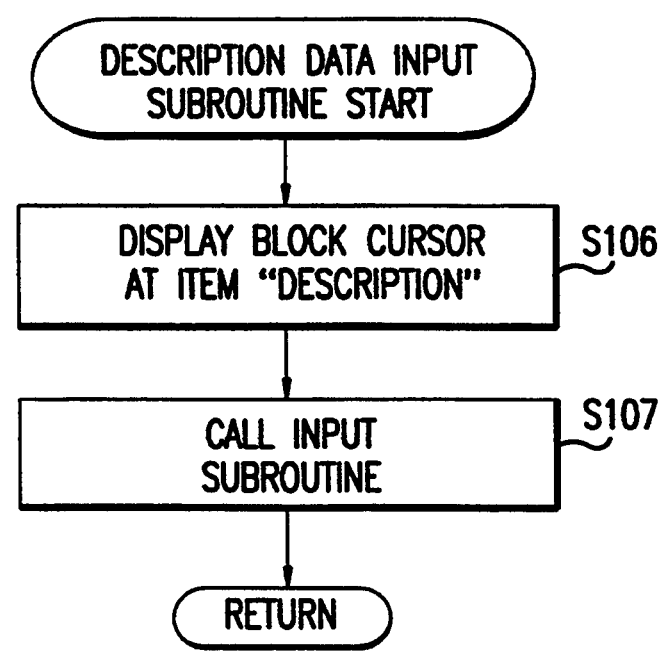
FIG. 15 is a schematic flowchart of a withdrawal description data input control routine.

Referring again to FIG. 12, the description data input subroutine shown in FIG. 15 is then called in step S92. Referring to FIG. 15, when the description data input subroutine is started, the block cursor is displayed at the item of "DESCRIPTION" to wait for inputting of a description (S106). Then, the actual input subroutine shown in FIG. 16 is then called in step S107. After printing the "description" item, control returns through steps S92 and S107 to step S35.

The program is then returned to S30 to display the input data as shown in FIG. 28 on the display 10. For example, as shown in FIG. 28, three sets of input characters corresponding to the three items of "DATE," "WITHDRAWAL" and "DESCRIPTION" are displayed on the display 10. Further, when printing the check CH by the operation of the print key, the three sets of input data are individually printed at the preset positions P1, P2 and P3 as shown in FIG. 30.

Figure 17:
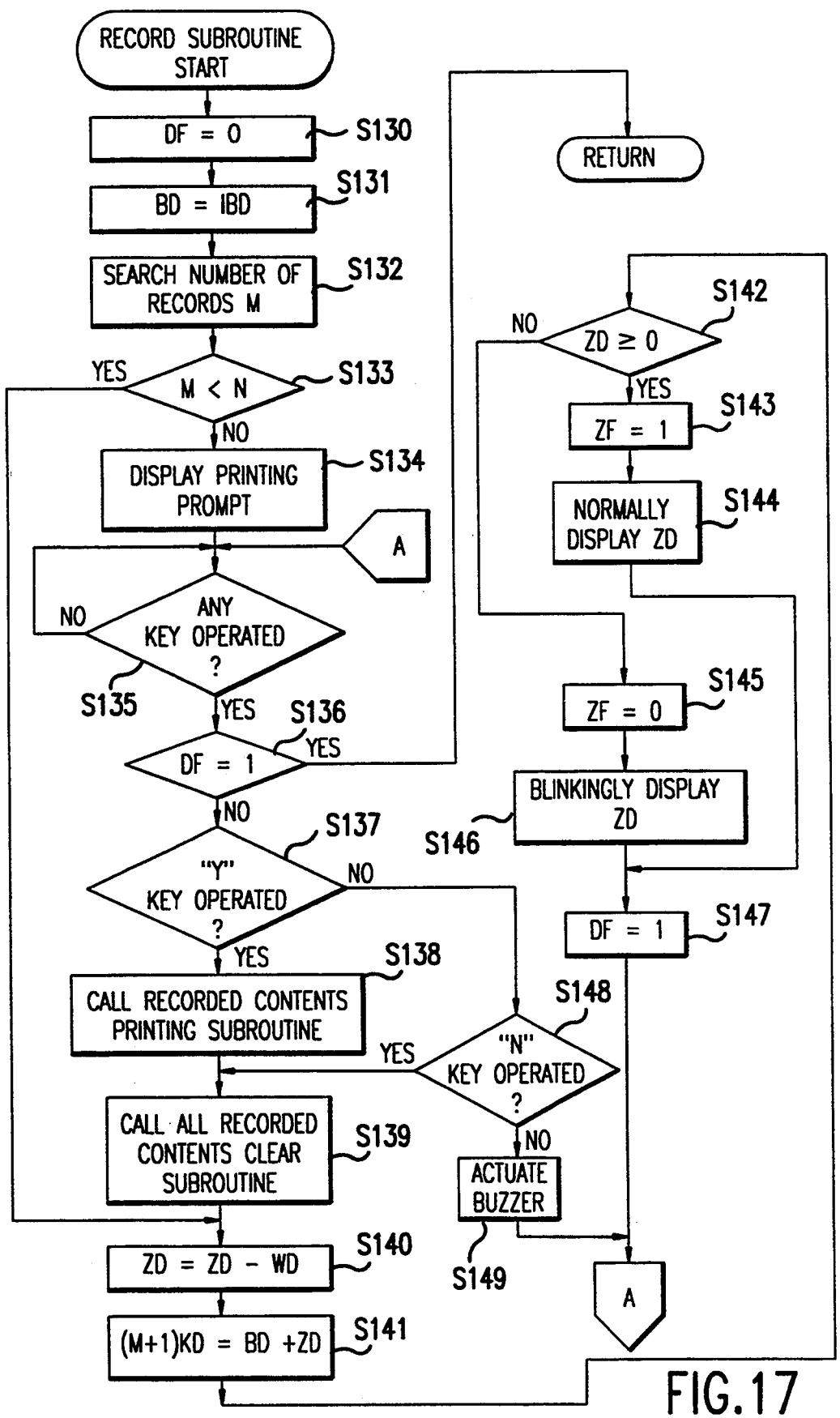
FIG. 17 is a schematic flowchart of a record control routine.

Next, referring to FIG. 6, if the record key is operated, so as to record the input data (step S31: Yes; steps S32 and S34: No), the record subroutine shown in FIG. 17 is called in step S37. Referring to FIG. 17, when the record subroutine is started, the display flag DF is reset (S130). Then, the buffer data IBD in the input data buffer 31 is stored into the save buffer 37 as buffer data BD (S131). The records M already recorded in the deposit-withdrawal memory 32 are then searched (S132). If the number of records M is smaller than the maximum number of records N recordable in the deposit-withdrawal memory 32 (step S133: Yes), withdrawal data WD included in the buffer data BD is subtracted from balance data ZD stored in the balance memory 33, and the difference obtained by the subtraction is stored as an updated balance data ZD into the balance memory 33 (S140).

Figure 31:
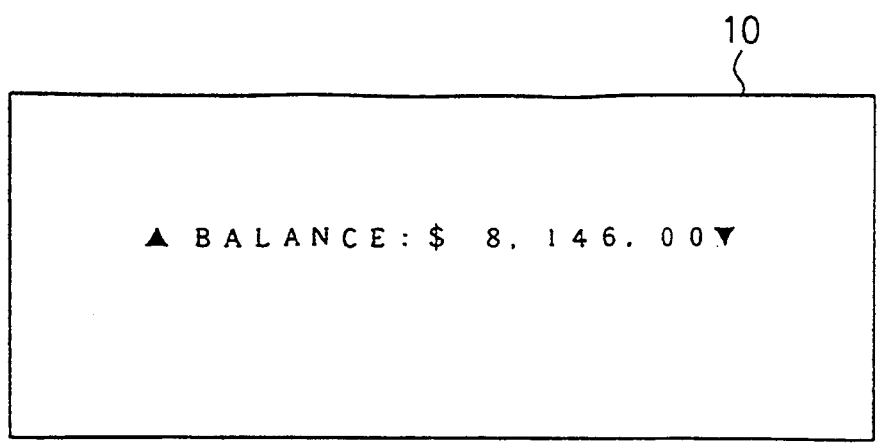
FIG. 31 shows a display of a balance when it is positive.

Then, the buffer data BD stored in the save buffer 37 and the updated balance data ZD stored in the balance memory 33 are additionally stored as new data into corresponding memory areas of the deposit-withdrawal memory 32 (S141). Then, if the update balance data ZD is positive, (i.e., not less than 0 (step S142: Yes), the balance flag ZF in the flag memory 38 is set to 1 (S143), and a positive balance according to the updated balance data ZD is displayed in a normal display condition on the display 10 (S144). For example, as shown in FIG. 31, the item of "BALANCE" and the plus balance are normally displayed on the display 10.

Figure 32:
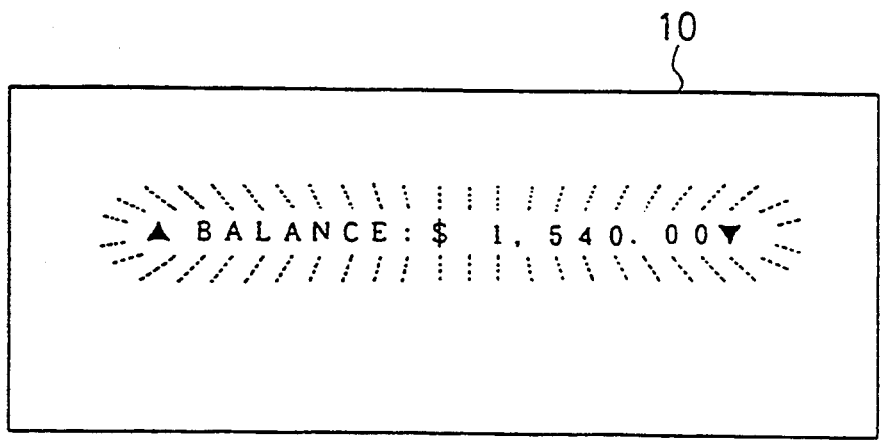
FIG. 32 shows a display of a balance when it is negative.

In contrast, if the update balance data ZD is negative (step S142: No), the balance flag ZF is reset to zero (S145), and a negative balance according to the updated balance data ZD is displayed in a flashing condition (blinking condition) on the display 10 (S146). For example, as shown in FIG. 32, the item of "BALANCE" and the negative balance are blinkingly displayed on the display 10. Thus, when the account becomes overdrawn, the display of the balance blinks to provide a warning, so that the overdrawn condition of the account can be confirmed.

Then, the display flag DF is set to 1 (S147). If any key of the keyboard 3 is then operated (steps S135 and S136: Yes), the record subroutine is ended and control returns to step S37 and proceeds to S30.

On the other hand, if the number of records M is equal to the maximum number of records N (step S133: No), a printing prompt indicating whether or not the recorded contents stored in the deposit-withdrawal memory 32 are to be printed is displayed (S134) and control waits for any key operation (S135). At this time, the display flag DF is 0 (step S136: No). Accordingly, if a character "Y" key is operated, so as to print the recorded contents (steps S135 and S137: Yes), the recorded contents are printed on a printing paper PP in a predetermined tabular format (S138). For example, as shown in FIG. 33, the recorded contents of the 30 sets stored in the deposit-withdrawal memory 32 are printed on a printing paper PP in a predetermined tabular format.

After printing the recorded contents, all the recorded contents of 30 sets stored in the deposit-withdrawal memory 32 are cleared from the memory 32 (S139). Then, the step S140 and the subsequent steps are executed as described above. The new data to be recorded (which would have gone into the "31st" recording area of the deposit-withdrawal memory 32) can now be recorded in the first recording area of the deposit-withdrawal memory 32. Thus, once all of the recorded contents stored in the deposit-withdrawal memory 32 are cleared from the memory 32, new updated balance data can be recorded in the first recording area of the deposit-withdrawal memory 32.

On the other hand, if a character "N" key is operated under the condition where the printing prompt is being displayed in S134, so as not to print the recorded contents (steps S135 and S148: Yes; steps S136 and S137: No), the printing of the recorded contents in step S138 is not executed. However, step S139 and the subsequent steps are executed. Further, if any key other than the character "Y" key and the character "N" key is operated under the condition where the printing prompt is being displayed in step S134 (step S135: Yes; steps S136, S137 and S148: No), the alarm buzzer 12 is actuated (S149), and control is returned to S135.

Referring once again to FIG. 6, if the cancel key is operated (steps S31 and S38: Yes; steps S32, S34 and S36: No), the withdrawal subroutine is ended and control returns to step S13. Control then proceeds to S10. However, if any key other than the position key, the document input key, the record key and the cancel key is operated (step S31: Yes; steps S32, S34, S36 and S38: No), the alarm buzzer 12 is actuated (S39), and the withdrawal control is returned to S30.

Referring once again to FIG. 5, if the numeral "2" key is operated to select the second "DEPOSIT" item (steps S11 and S12: No; step S14: Yes), the deposit subroutine shown in FIG. 18 is called in step S15.

Figure 18:
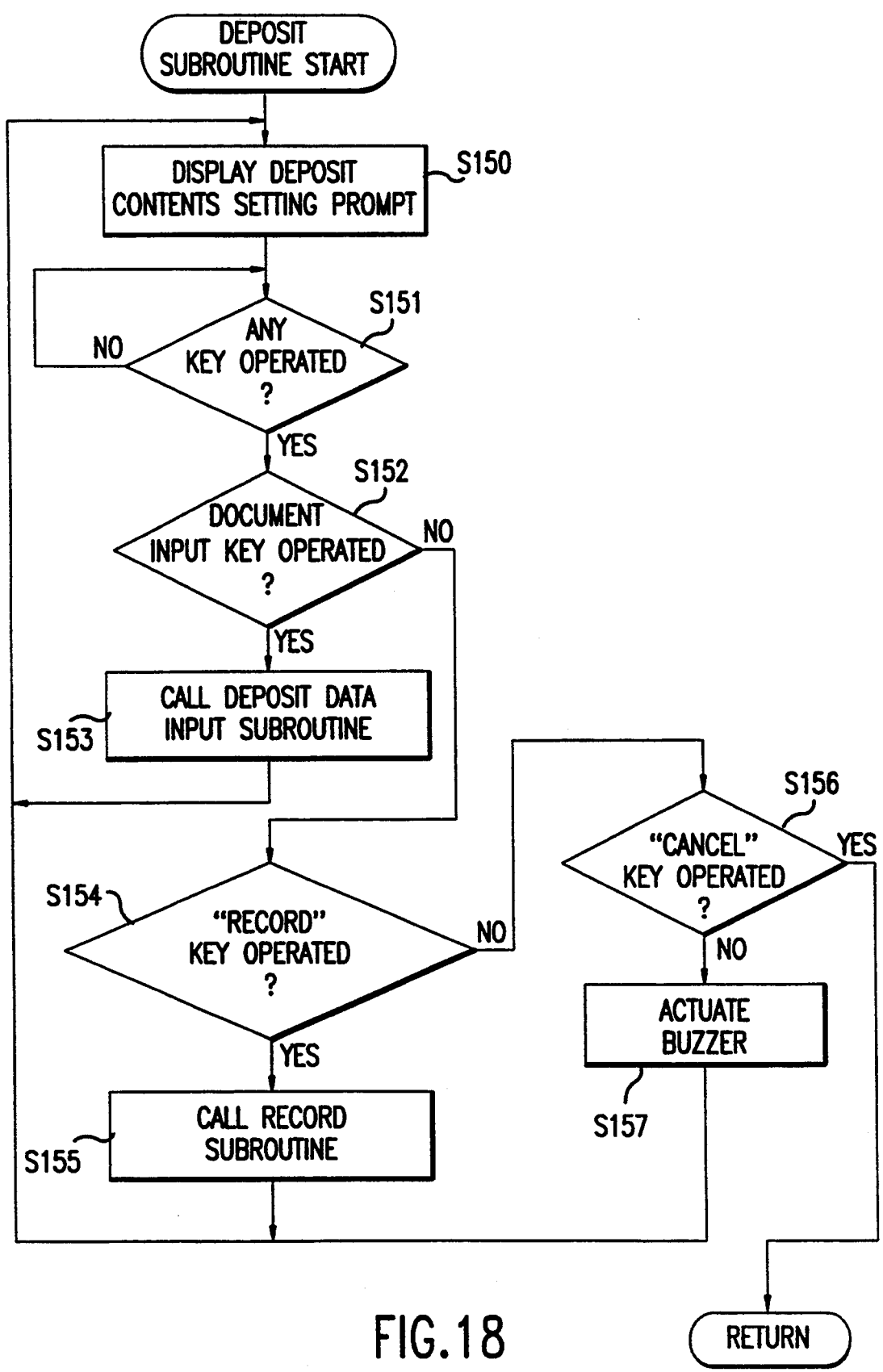
FIG. 18 is a schematic flowchart of a deposit control routine.

Referring to FIG. 18, if the deposit subroutine is started, a deposit contents setting prompt is first displayed on the display 10 (S150). For example, this setting prompt is composed of three items of "DATE," "DEPOSIT" and "DESCRIPTION" as shown in FIG. 34. Each of these three items to be input is followed by an underlined field and characters are adapted to be input within each underlined field.

Figure 19:
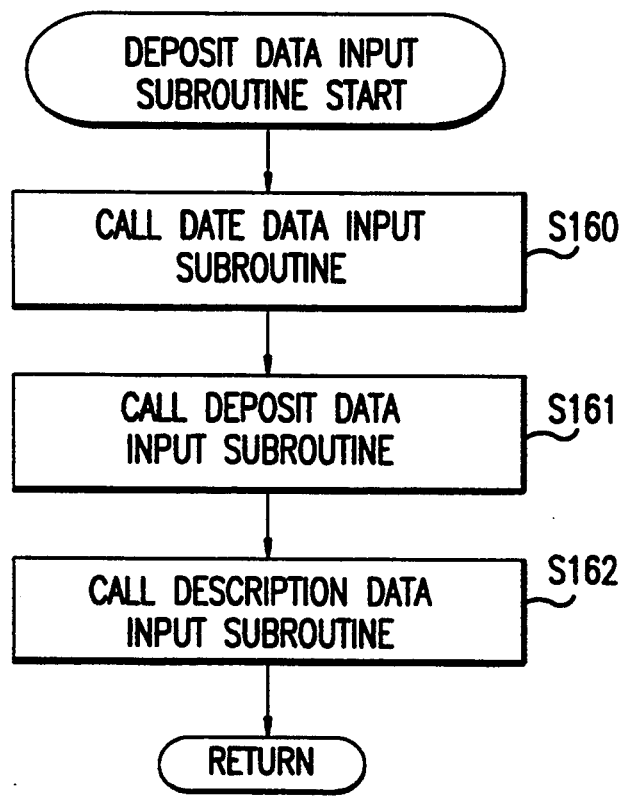
FIG. 19 is a schematic flowchart of a deposit data input control routine.

Thereafter, if the document input key is operated (steps S151 and S152: Yes), the deposit data input subroutine shown in FIG. 19 is called in step S153. Referring to FIG. 19, when the deposit data input subroutine is started, a date data input subroutine shown in FIG. 20 is called in step S160.

Figure 20:
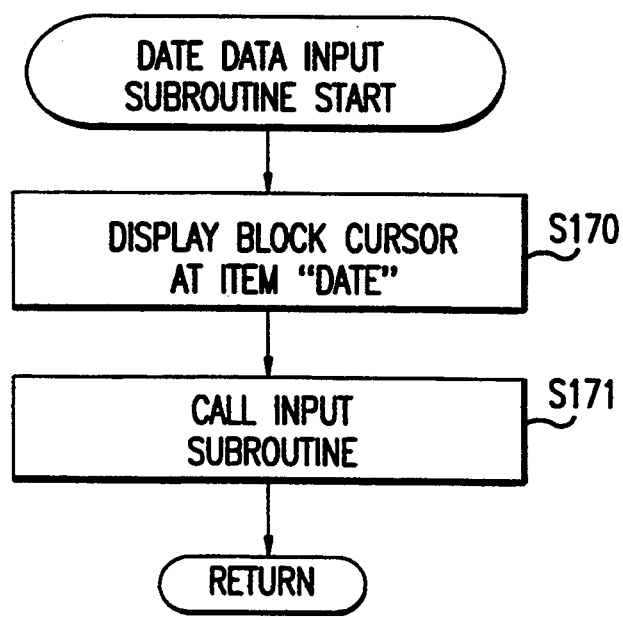
FIG. 20 is a schematic flowchart of a deposit date data input control routine.
Figure 23:
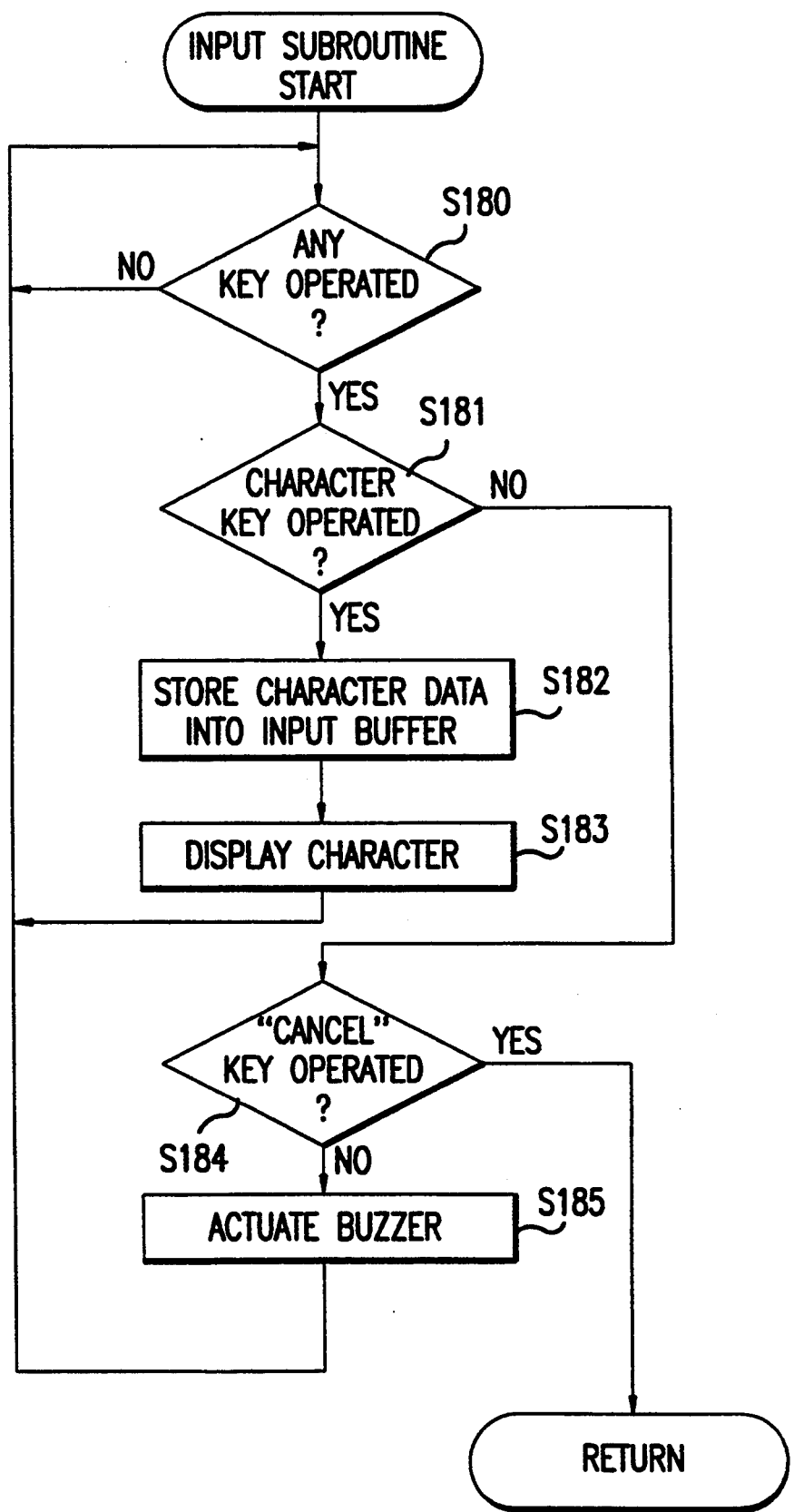
FIG. 23 is a schematic flowchart of an input control routine in the deposit control.

Referring to FIG. 20, when the date data input subroutine is started, the block cursor is displayed at the "DATE" field to wait for the input of a date (S170), and a date data input subroutine shown in FIG. 23 is called in step S171.

Referring to FIG. 23, when the date data input subroutine is started, and desired character keys are operated (steps S180 and S181: Yes), code data corresponding to the character keys operated are stored into a date data memory area of the input data buffer 31 (S182), and characters corresponding to the character keys operated are displayed on the display 10 (S183). Then, control is returned to step S180. For example, as shown in FIG. 35, the date of "Aug. 5, 1991" is displayed on the right-hand side of the item "DATE" on the display 10.

When the cancel key is operated (steps S180 and 184: Yes; step S181: No), the date data input subroutine ends, control returns to step S160 and control proceeds to S161. Further, if any key other than the character keys and the cancel key is operated (step S180: Yes; steps S181 and S184: No), the alarm buzzer 12 is activated (S185), and control is returned to step S180.

Figure 21:
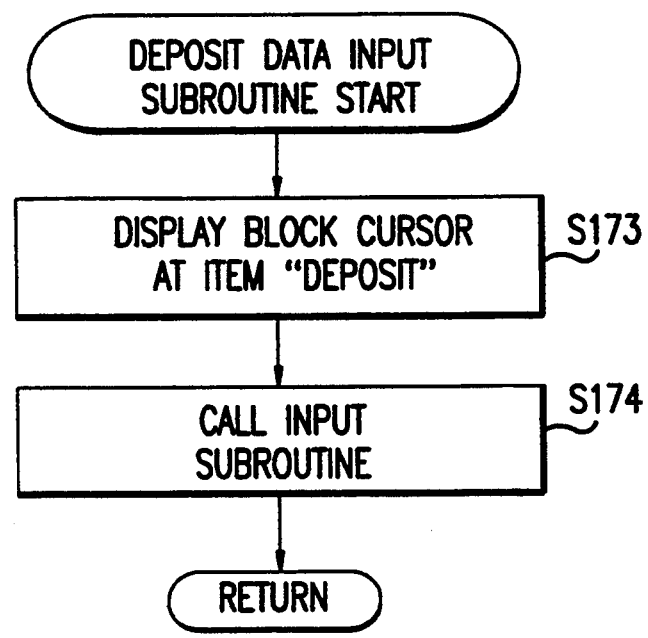
FIG. 21 is a schematic flowchart of a deposit amount data input control routine.

Referring once again to FIG. 19, a deposit data input subroutine shown in FIG. 21 is then called in step S161. Referring to FIG. 21, when the deposit data input subroutine is started, the block cursor is displayed at the "DEPOSIT" field to wait for the input of a deposit amount (S173), and the actual input subroutine shown in FIG. 23 is then called again in step S174. After inputting the "Deposit" item, control returns to step S161 through step S174.

Figure 22:
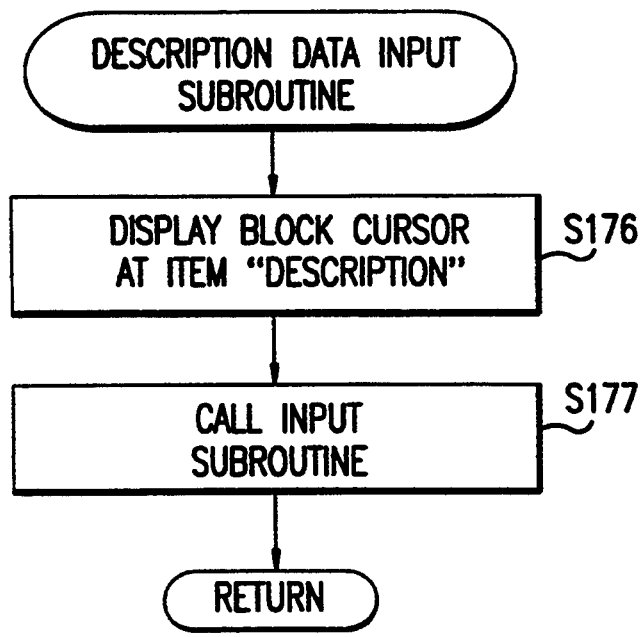
FIG. 22 is a schematic flowchart of a deposit description data input control routine.

Referring once again to FIG. 19, a description data input subroutine shown in FIG. 22 is then called in step S162. Referring to FIG. 22, when the description data input subroutine is started, the block cursor is displayed at the "DESCRIPTION" field to wait for the input of a deposit description (S176), and an actual input subroutine shown in FIG. 23 is then called once again in step S177. After inputting the "Description" item, control returns to step S162 through step S177. Then, the program is returned to step S153 from step S162. Control then proceeds to step S150 to display the input data as shown in FIG. 35 on the display 10. For example, as shown in FIG. 35, three sets of input characters corresponding to the three "DATE," "DEPOSIT" and "DESCRIPTION" fields are displayed on the display 10.

Next, referring to FIG. 18, if the record key is operated, so as to record the input data (steps S151 and S156: Yes; step S152: No), the record subroutine shown in FIG. 17 and described above is called by step S155.

On the other hand, if the cancel key is operated (steps S151 and S156: Yes; steps S152 and S154: No), this input subroutine is ended and control returns to step S15, and proceeds to S10. Further, if any key other than the document input key, the record key and the cancel key is operated (step S151: Yes; steps S152, S154 and S156: No), the alarm buzzer 12 is activated (S157), and control is returned to S150.

Referring once again to FIG. 5, when the numeral "3" key is operated, so as to clear the recorded contents (steps S11 and S16: Yes; steps S12 and S14: No), a clear subroutine shown in FIG. 24 is called by step S17.

Figure 24:
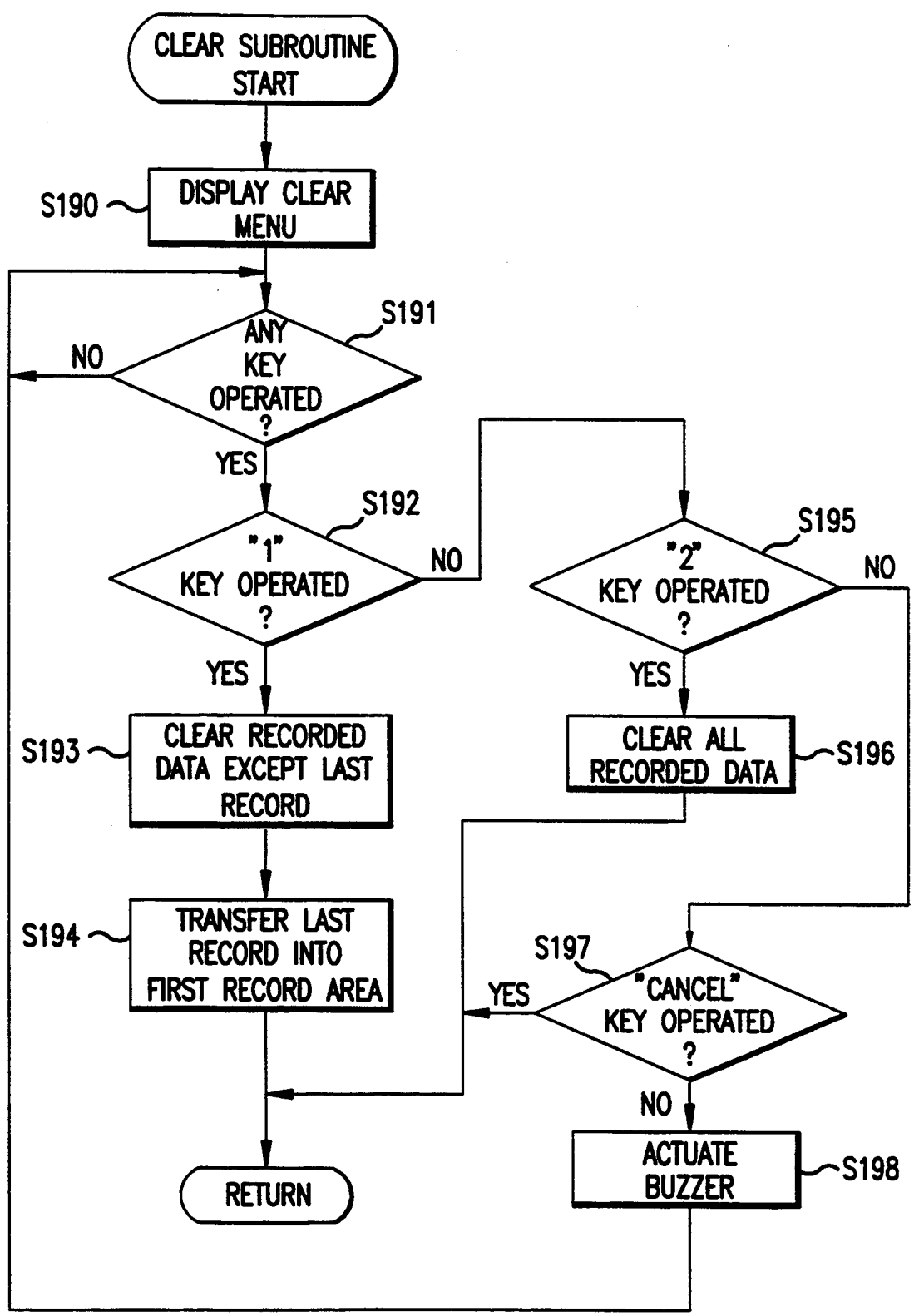
FIG. 24 is a schematic flowchart of a clear control routine.
Figure 36:
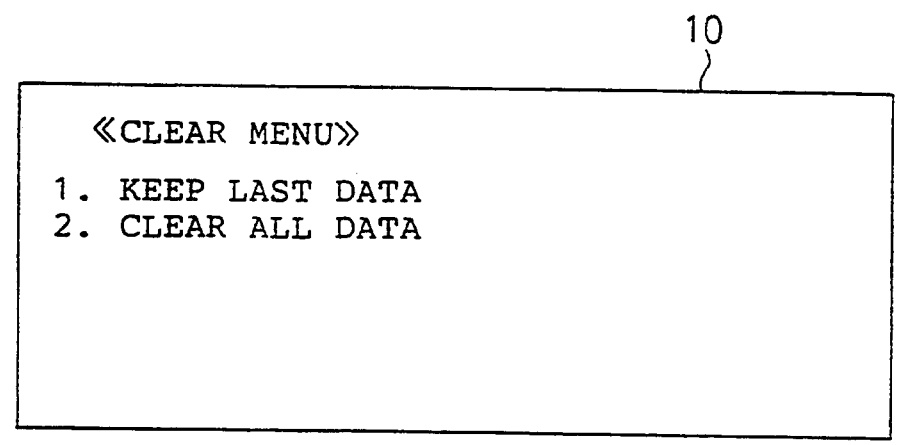
FIG. 36 shows a clear menu relating to clear processing.

Referring to FIG. 24, when the clear control is started, a clear menu is displayed on the display 10 (S190). For example, the clear menu to be displayed comprises two items as shown in FIG. 36. That is, the two items are "KEEP LAST DATA", labeled with the selection numeral "1", which clears the recorded data except the last data; and "CLEAR ALL DATA", labeled with the selection numeral "2", which clears all the recorded data.

If the numeral "1" key is operated (steps S191 and S192: Yes), the recorded data stored in the deposit-withdrawal memory 32, except for the last data set, are cleared (S193). In other words, only the last data set is kept in the memory 32, and all the remaining recorded data are cleared from the memory 32. Then, the last data set is transferred from the last recording area to the first recording area in the memory 32 (S194). This clear subroutine ends, and control returns to step S17 and then proceeds to step S10.

On the other hand, if the numeral "2" key is operated (steps S191 and S195: Yes; step S192: No), all the recorded data stored in the deposit-withdrawal memory 32 are cleared from the memory 32 (S196). This clear subroutine ends, and control again returns to step S17 and proceeds to step S10. Further, if the cancel key is operated (steps S191 and S197: Yes; steps S192 and S195: No), none of the recorded data is cleared, and this clear subroutine again ends, and control again returns to step S17 and then proceeds to step S10. However, if any key other than the numeral "1" key, the numeral "2" key and the cancel key is operated (step S191: Yes; steps S192, S195 and S197: No), the alarm buzzer 12 is actuated (S198), and control is returned to step S191.

Referring once again to FIG. 5, if the numeral "4" key is operated, so as to print the recorded contents (steps S11 and S18: Yes; steps S12, S14 and S16: No), the recorded contents are printed on a printing paper PP in a predetermined tabular format in substantially the same procedure as in step S138 of the record subroutine. For example, as shown in FIG. 33, the recorded contents stored in the deposit-withdrawal memory 32 are printed on the printing paper PP in a predetermined tabular format.

On the other hand, if the cancel key is operated (steps S11 and S20: Yes; steps S12, S14, S16 and S18: No), the control routine for check printing and balance management ends, and control proceeds to a main routine (not shown). However, if any key other than the numeral "1" key, the numeral "2" key, the numeral "3" key, the numeral "4" key and the cancel key is operated (step S11: Yes; steps S12, S14, S16, S18 and S20: No), the alarm buzzer 12 is actuated (S21), and control is returned to S10.

As described above, the print start positions of data of characters including alphabetic letters, numerals and symbols to be printed on the check CH in relation to the items of "DATE," "WITHDRAWAL" and "DESCRIPTION" can be individually set and stored into the print position memory 34. Furthermore, these data themselves can be individually stored into the deposit-withdrawal memory 32, and they are individually printed at the preset print positions P1 to P3 on the check CH. Accordingly, the check printing operation for printing the necessary information at desired positions on the check CH can be greatly simplified, and the efficiency of the operation can be improved.

Further, input data of a date, description, deposit or withdrawal amount, and updated balance are stored as a single set into the deposit-withdrawal memory 32, and 30 such sets of data can be stored into the memory 32. Furthermore, an updated balance after deposit or withdrawal can be obtained from input data of deposit or withdrawal and the current balance data stored in the deposit-withdrawal memory 32. Accordingly, management of a balance in an account can be personally performed.

In addition, when the updated balance becomes negative, this negative balance is displayed in a blinking condition, so that the operator can confirm whether or not the updated balance becomes negative upon writing the check CH.

In a preferred modification, many additional kinds of information, such as a name of a drawer and a place of writing may be stored into the deposit-withdrawal memory 32. Further, a plurality of differently arranged checks, having differently arranged print positions for the necessary information to be printed on each check, may be individually stored into the print position memory 34. Further, a check data memory different from the deposit-withdrawal memory 32 may be provided to store standard character data to be printed on the check CH. Further, when an updated balance becomes negative, the alarm buzzer 12 may be activated in combination with the blinking display of this negative balance. Alternatively, when using a color display as the display 10, the negative balance may be displayed in red, for example. In this way, the negative condition of the updated balance may be indicated by using various techniques. Further, the present invention is applicable to various electronic typewriters provided with various types of printers, such as a wire dot printer, thermal printer and a laser printer. In these electronic typewriters, data of print character size and font may also be set in a format for check print.

While advantageous embodiments have been chosen to illustrate the invention, it will be understood by those skilled in the art that various changes and modifications can be made therein without departing from the scope of the invention as defined in the appended claims.

What is claimed is:

1. A method for maintaining checking account records using a typewriter, comprising the steps of:
    inputting current account data corresponding to a single transaction;
    recording the current account data corresponding to a single transaction as a single transaction record in a record memory, the record memory storing a plurality of transaction records, the plurality of recorded transaction records being stored indefinitely on the record memory;
    displaying the current account data on the display; and
    printing the current account data from a portion of the plurality of recorded transaction records stored in the record memory; and
    in response to the printing step, automatically erasing the printed transaction records from the record memory.

2. The method of claim 1, further comprising the step of defining print location data corresponding to print locations on a check to be printed.

3. The method of claim 2, wherein the account data includes print character data corresponding to characters to be printed on the check at the print locations.

4. The method of claim 3, wherein the print character data includes at least one of withdrawal amount data, payee data, date data, drawer data, description data, and place data.

5. The method of claim 2, wherein the printing step comprises printing the account data onto the check at the defined print locations.

6. The method of claim 1, wherein the printing step includes the step of printing the account data corresponding to each transaction record as a single record.

7. The method of claim 6, wherein all the recorded account data is printed.

8. The method of claim 7, wherein all the recorded account data is erased.

9. The method of claim 7, wherein all the recorded account data except the account data corresponding to a last transaction is erased.

10. The method of claim 1, further comprising the step of updating the account balance of the checking account based on the account data.

11. The method of claim 10, wherein the updating step includes the step of updating the account balance based on the withdrawal amount data.

12. The method of claim 11, wherein the recording step includes recording the updated account balance with the account data corresponding to a single transaction.

13. The method of claim 10, wherein the displaying step includes displaying a positive updated account balance in a first manner, and displaying a negative updated account balance in a second manner.

14. The method of claim 13, wherein the first manner is a constant display, and the second manner is a blinking display.

15. The method of claim 1, further comprising the step of printing a plurality of transaction records in a predetermined tabular form in response to inputted commands.

16. A typewriter having a check printing function, comprising:
    an input means for inputting character data and commands;
    a display means for displaying the inputted character data;
    print means for printing the inputted character data;
    check data memory means for indefinitely storing the inputted character data, the check data memory means capable of storing data corresponding to a plurality of transactions;
    print control means for controlling the print means to print the character data from a portion of the plurality of recorded transactions stored in the check data memory in response to a first print command, wherein the print control means automatically erases the printed transactions from the check data memory in response to printing the portion of the plurality of recorded transactions; and
    control means for controlling the display means, the check data memory means and the print control means in response to the inputted commands.

17. The typewriter of claim 16, further comprising a format determining means for determining print fields of an operator-determined format corresponding to print locations on the check, the print control means further controlling the print means to print the character data from one of the plurality of recorded transactions stored in the check data memory onto a check in the operator-determined format in response to a second print command.

18. The typewriter of claim 16, wherein the inputted character data corresponding to a check comprises at least one of date data, description data, amount data, payee data, drawer data and place data.

19. The typewriter of claim 16, wherein the check data memory means stores the inputted character data corresponding to each check as a single transaction record, and the print control means further controls the print means to print the portion of the plurality of transaction records stored in the check data memory means in a predetermined tabular form in response to the inputted commands.

20. The typewriter of claim 18, further comprising a balance updating means for updating an account balance based on the withdrawal amount data.

21. The typewriter of claim 20, further comprising a warning means for indicating when the account balance is overdrawn.

22. The typewriter of claim 21, wherein the warning means comprises at least one of an audible alarm and a visual alarm, the visual alarm being displayed on the display means.

23. The typewriter of claim 22, wherein the visual alarm comprises displaying the account balance in a first state when it is not overdrawn, and displays the account balance in a second state when it is overdrawn.

24. The typewriter of claim 23, wherein the first state is a non-blinking mode, and the second state is a blinking mode.

* * * * *